United States Patent [19]
Laney

[11] 3,725,657
[45] Apr. 3, 1973

[54] METHOD AND APPARATUS FOR DETERMINING EFFICIENCY IN A LIQUID SCINTILLATION COUNTING SYSTEM

[75] Inventor: Barton H. Laney, Deerfield, Ill.

[73] Assignee: Nuclear-Chicago Corporation, Des Plaines, Ill.

[22] Filed: June 11, 1971

[21] Appl. No.: 152,092

Related U.S. Application Data

[63] Continuation-in-part of Ser. No. 792,717, Jan. 21, 1969, Pat. No. 3,626,187.

[52] U.S. Cl.............250/71.5, 250/83.3, 250/106 SC
[51] Int. Cl................................................G01j 39/18
[58] Field of Search....250/71.5, 71.55, 83.3, 106 SC

[56] References Cited

UNITED STATES PATENTS

| | | | |
|---|---|---|---|
| 3,320,419 | 5/1967 | Thomas et al. | 250/83.3 R |
| 3,626,187 | 12/1971 | Laney | 250/83.3 R |
| 3,114,835 | 12/1963 | Packard | 250/71.5 R |

Primary Examiner—James W. Lawrence
Assistant Examiner—Harold A. Dixon
Attorney—Lowell C. Bergstedt et al.

[57] ABSTRACT

In a liquid scintillation system utilizing plural photomultiplier means, a method and apparatus for determining efficiency of coincident pulse detection. The invention is particularly useful for compensating for color quenching in liquid samples. Various incremental counting efficiency levels are associated with asymptotic functions in a two dimensional matrix in which the abscissa and ordinate correspond to the pulse heights of each of a pair of coincident pulses from different photomultiplier means. An efficiency determining point is located in the matrix based on the sum of the pulse heights of each of the coincident pulses as well as on the amplitude of the smallest pulse of the coincident pulses. The single counting efficiency level associated with a function passing through the efficiency determining point is recorded as the level of efficiency at which the photomultiplier means detect scintillations that generate coincident pulses having pulse heights equal to those recorded.

21 Claims, 13 Drawing Figures

PATENTED APR 3 1973 3,725,657

INVENTOR.
BARTON H. LANEY

BY Charles H. Thomas Jr.

INVENTOR.
BARTON H. LANEY

METHOD AND APPARATUS FOR DETERMINING EFFICIENCY IN A LIQUID SCINTILLATION COUNTING SYSTEM

This is a continuation in part of Ser. No. 792717, filed Jan. 21, 1969, now U.S. Pat. No. 3 626 187.

This invention relates to a method and apparatus for determining counting efficiency in a liquid scintillation radiation detection and coincidence counting apparatus.

In every such system it is necessary to determine the efficiency of detection or radioactive events in order to ascertain the true number of disintegrations per unit time. All liquid scintillation detecting devices currently manufactured operate at well below 100 percent efficiency. In present systems, the average efficiency is determined over a period of time and the raw pulse count is divided by the percent efficiency in order to ascertain the true number of radioactive events per unit time in a liquid sample in a liquid scintillation system.

BACKGROUND OF THE INVENTION

There are currently several conventional methods for determining efficiency in a liquid scintillation system. One widely used method is internal standardization. This technique consists of counting scintillations from radioactive events in the liquid sample to be analyzed, then adding a known amount of radioactivity in a compatible form. The sample with the increased radioactivity is then recounted. The efficiency is determined by dividing the count rate increment due to the internal standard by the known disintegration rate of the internal standard. Among the disadvantages associated with internal standardization is the requirement that the sample must be handled twice and opened, with the possibility that the counting efficiency may be modified by condensation or evaporation. In addition, the sample is altered and cannot be recounted. Furthermore, each newly prepared standard solution must be compared to a permanent standard for continuity. In addition to possible pipetting errors, the precision of internal standardization falls off with increases in color quenching, which is the absorption of some of the light produced by the scintillations in a colored sample solution.

External standardization involves an external standard of a source of gamma radiation of known radiation characteristics. Disintegrations from the liquid sample to be analyzed are first counted without the external standard. Thereafter, the external standard is positioned near the liquid sample. The external standard emits gamma rays that induce scintillations by the scintillation fluor in the liquid sample. Calibration curves are constructed for each radioactive isotope serving as an external standard and for a particular scintillation fluor in each solvent system by means of a set of standard samples containing known amounts of radioactivity and various concentrations of quencher covering the useful efficiency range. The count rate produced by the external standard in each sample to be analyzed can be correlated with the efficiency as determined by the count rate of the isotope within each standard. If a low energy gamma emitter is used as an external standard, however, it is necessary to subtract the contribution of the sample isotope that falls in the energy range in which the external standard is being counted.

Still another method of obtaining efficiency is through the sample channels ratio method. This method makes use of the information contained in the shape of the plot of number of counts versus pulse height for a particular radioactive isotope and a particular scintillation fluor in a solvent system. Since quenching affects the average photon yield per disintegration, the pulse height distribution varies with degree of quenching. Two counting energy windows may be positioned, relative to the pulse height spectrum, such that the ratio of the net count rates in the two windows can be made to vary monotonically with the degree of quenching. A calibration curve relating the ratio of the channel net count rates to isotope counting efficiency can then be constructed. One disadvantage of this method of determining efficiency is that a set of sealed standard samples, each containing an accurately known amount of activity with various concentrations of quencher, are necessary to serve as calibration points on the sample channels ratio versus counting efficiency curve for the isotope of interest.

Besides the disadvantages already listed, all current methods of efficiency determination have the disadvantage of achieving average efficiency count over a period of time. The end product from the conventional liquid scintillation systems is a count rate from which average efficiency must be manually derived by reference to calibration curves or by arithmetic calculations.

Furthermore, with conventional efficiency determination methods, while consistent average efficiency results are obtained utilizing identical radioactive samples, the spectral distribution of recorded pulse counts varies considerably depending upon the degree of color quenching present. The counting results obtained, therefore, are useful in a spectral analysis only when compared with other samples in the same liquid system with the same degree of color quenching present.

SUMMARY OF THE INVENTION

In the present invention the efficiency of pulse counting for all coincident pulses of characteristic pulse heights is determined on a probability basis for each set of coincident pulses recorded. Because there is an efficiency determination for each set of coincident pulses recorded, rather than an average efficiency determination, an adjustment can be made within the liquid scintillation system for the inefficiency of counting, and the output of the liquid scintillation system can be in the form of pulse counts corrected to reflect the true number of disintegrations per unit time.

Another object of the invention is to determine efficiency in a manner in which the composition and character of the scintillation fluor, the radioactive source, the sample solute, and the degree of color quenching are immaterial. Utilizing this system, such external references as calibration curves, sealed sample standards, internal standards, and external standards may be dispensed with entirely. Moreover, such previously necessary features as double counting and plural energy windows are not necessary for efficiency determination nor for a corrected disintegration count derived therefrom.

Another primary object is to more accurately determine the actual number of events of each energy level actually occurring in the liquid scintillation system by basing efficiency determination on the smallest pulse height, rather than upon the additive sum of pulse heights of two coincident pulses, such as is common in conventional systems.

Furthermore, the smaller pulse height may also be used with or without the improved efficiency determination described herein to compensate for color quenching in a liquid sample. It can be shown that a pulse height analysis based on the smallest of two coincident pulses results in coincident pulse counts more accurately and consistently representative of the actual detection efficiency than the summed pulse height analysis regardless of the degree of color quenching which may be present. This is because a coincident pulse count so derived is less sensitive to color quenching than is a coincident pulse count derived from the sum of two coincident pulses.

In one broad aspect this invention is a method for determining counting efficiency in a liquid scintillation radiation detecting and coincidence counting apparatus from coincident pulses generated by a pair of photomultiplying means resulting from scintillations caused by radioactive events comprising: selecting the smaller of two coincident pulses, approximating counting efficiency level by equating counting efficiency level to a mathematical function in which the smallest of two coincident pulses is the predominating independent variable and solving said mathematical function for a single counting efficiency level associated with the aforesaid smaller of said two coincident pulses.

In another aspect this invention is, in a liquid scintillation radiation detecting and coincidence counting apparatus having a plurality of photomultiplier means for generating pulses, a coincidence detector for detecting coincident pulses and equipped with a threshold amplitude detector, a pulse summing means, a pulse height analysis means, and a pulse count register means, the improvement comprising an efficiency determining means including a lesser pulse height selecting means for determining the smaller of two coincident pulses; a function generating means for acting upon the aforesaid smaller of said two coincident pulses in accordance with a mathematical function to produce a signal uniquely associated with the magnitude of the aforesaid smaller of said two coincident pulses, and a counting efficiency level recording means for accepting the aforesaid signal as the approximate counting efficiency level of the coincident pulses received.

BRIEF DESCRIPTION OF THE INVENTION

This invention may be more fully explained and the preferred embodiments depicted in the accompanying drawings in which.

DETAILED DESCRIPTION OF THE INVENTION

Figure 1:
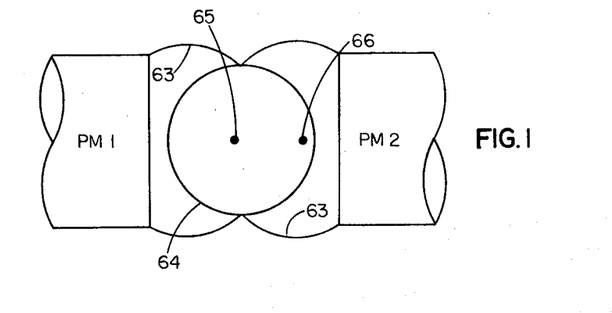
FIG. 1 is a plan schematic view of a liquid sample positioned in a viewing chamber in a liquid scintillation detecting device.

Referring now to FIG. 1, there is illustrated a sample vial 64 positioned in a scintillation counting chamber bounded by aluminum coated reflecting walls 63 and photomultiplier tubes PM1 and PM2. Because of the relative dimensions involved, it can be seen that scintillations resulting from radioactive events in sample vial 64 may occur in significantly closer proximity to one photomultiplier tube than to another. For example, the scintillation resulting from a radioactive disintegration and occurring in the scintillation fluor at the point denoted as 66 is in closer proximity to PM2 than it is to PM1. Another scintillation at 65 occurring at the center of the sample vial, on the other hand, is practically equidistant between PM1 and PM2. Because the intensity of the photons of light emitted by a scintillation decrease with distance from the scintillation, it is logical that more photons will be received by PM2 than by PM1 due to the scintillation at 66. This effect is magnified when the liquid in the vial 64 is colored, and color quenching occurs. Morever, because of intrinsic inefficiencies within the scintillation detecting system, a scintillation at 66 of a fairly large magnitude will not always be detected, even by PM2. There is therefore a probability of detection less than unity associated with photomultiplier tube PM2 for a scintillation of specified magnitude occurring at 66. The probability of detection of that same scintillation by PM1 is much smaller. Since in practice all scintillation counting is conducted for a large number of events, the probability of scintillation detection is numerically equal to the efficiency of detection. For a scintillation of a specified magnitude occurring at a specified location within the vial 64, therefore, there is associated an efficiency $E_2$ of detection by PM2 and an efficiency $E_1$ of detection by PM1. In order for a scintillation to be recorded as representing a radioactive event, the scintillation must be recorded as representing a radioactive event, the scintillation must be recorded by both PM2 and PM1 in a coincidence counting system. The probability of coincident pulses being produced in both PM2 and PM1, then, is equal to the probability that the scintillation will produce a pulse in PM2 times the probability that the scintillation will produce a pulse in PM1. This product may be termed the probability of coincidence. Since efficiency and probability are numerically equal, the coincidence efficiency may be represented as $E_c$ and: $E_c = E_1 \times E_2$.

Figure 2:
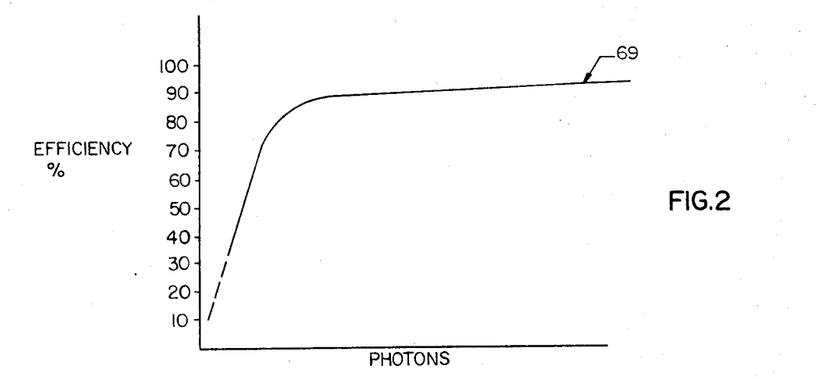
FIG. 2 illustrates the relationship between efficiency of scintillation detection and light energy received.
Figure 3:
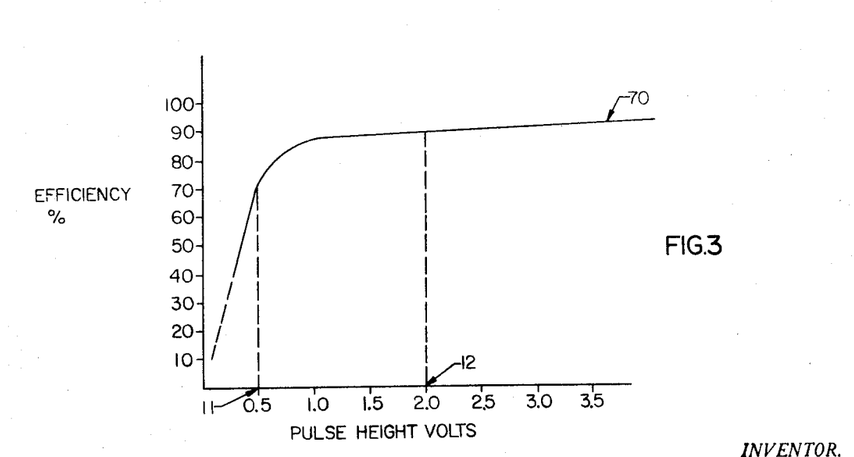
FIG. 3 illustrates the relationship between efficiency of scintillation detection and pulse height.

The relationship between the number of photons from a scintillation striking a photomultiplier tube, and the efficiency of scintillation detection conforms generally to the curve 69 of FIG. 2. That is, there is a proportional relationship between photons of light received from a scintillation and efficiency up to a certain point where the efficiency of detection rapidly levels out. Since, due to the characteristics of photomultiplier tubes, there is an equal relationship between the number of photons striking a photomultiplier tube and the height of a pulse produced by the photomultiplier tube as a result thereof, the curve 70 in FIG. 3 is in conformity with the curve 69 in FIG. 2. In both instances it should be noted that the relationships depicted become unreliable for weak scintillations at the lower end of the curve. The numeric values used in FIG. 3 are pertinent for purposes of examples only, and are not in any way limiting to this invention. It is rather the shape of the curve 70 that remains consistent among photomultiplier tubes of a type despite the various abscissa and ordinate values that may be associated with various points on the curve 70.

With FIG. 3 in mind, it can be shown that except where both pulses produced in the photomultiplier tubes are very low, the coincidence efficiency is largely a function of the amplitude of the smaller of two coincident pulses. For example, where the largest voltage pulse is 2.0 volts, corresponding to the point 12 on curve 70, and the efficiency (or probability) of detection is 0.90, and the smallest voltage pulse is 0.5 volts, corresponding to the point 11 on curve 70, and the efficiency of detection is 0.70, a change in the smaller voltage pulse of 0.25 volts will have a much greater effect on the coincidence efficiency than does an identical change in the larger efficiency. That is, with voltage pulses of 2.0 volts and 0.5 volts, the coincidence efficiency $E_c = 0.90 \times 0.70 = 0.63$. If the smaller voltage pulse drops by 0.25 volts, the corresponding tube efficiency falls to 0.36. Then, $E_c = 0.90 \times 0.36 = 0.324$. This is a net change of $(0.630 - 0.324)$ or 0.31. Conversely, if the larger voltage pulse drops by 0.25 volts to a value of 1.75 volts then the corresponding tube efficiency falls to only 0.89. It follows that $E_c = 0.89 \times 0.70 = 0.623$. The incremental drop in $E_c$ is therefore equal to only 0.007, a much smaller drop than occurred when the smaller voltage pulse changed. This domination of the coincidence efficiency function by the smaller voltage pulse amplitude is most dramatic when the smaller and larger pulses fall on the curve 70 in the regions surrounding the voltage pulses 11 and 12 respectively. The smaller voltage pulse is always more important than the larger voltage pulse in determining the value of $E_c$.

Figure 4:
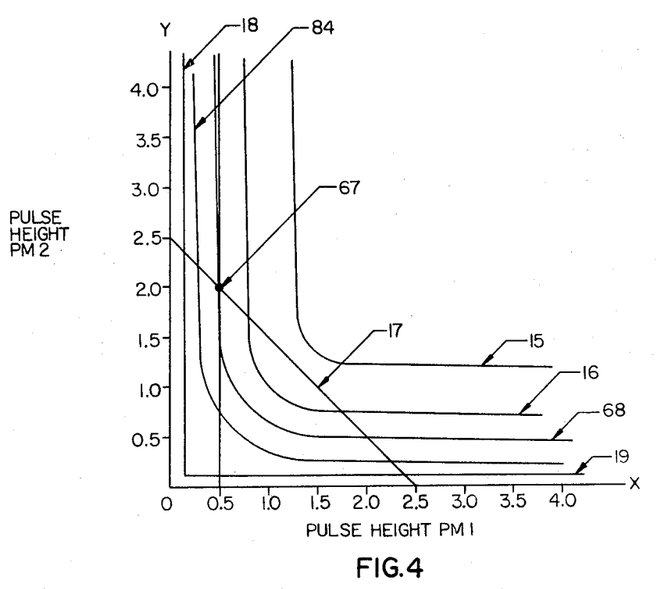
FIG. 4 illustrates the basis upon which counting efficiency is determined in this invention.

In conventional liquid scintillation systems, a pulse height analysis is normally performed in order to maximize the number of true radioactive events recorded and in order to minimize background pulses having various origins. A pulse height analysis usually involves the acceptance only of pulses falling with-in a region defined between two pulse amplitude sums in a two dimensional coordinate system utilizing as abscissa and ordinate, the pulse heights from each of two photomultiplying means. A typical pulse height sum is illustrated at 17 in FIG. 4. It has been discovered that not only are pulse height sums useful in determining which coincident pulses should be accepted and which should be rejected, but they may also be used to determine efficiency as will hereinafter be explained. In the matrix of FIG. 4, the constant sum line 17 is the locus of all points having pulse height amplitude sums identical to the sum of amplitudes of the pulses 11 and 12 illustrated in FIG. 3. That is, the pulse height sum for all points on sum line 17 is 2.5 volts. Because, as has previously been explained, coincidence detection efficiency is largely a function of the smaller pulse height of two coincident pulses, an efficiency determining point 67 is located in FIG. 4 at the intersection of the locus of points having a pulse height 11 and the locus of the constant sum line 17.

Figure 5:
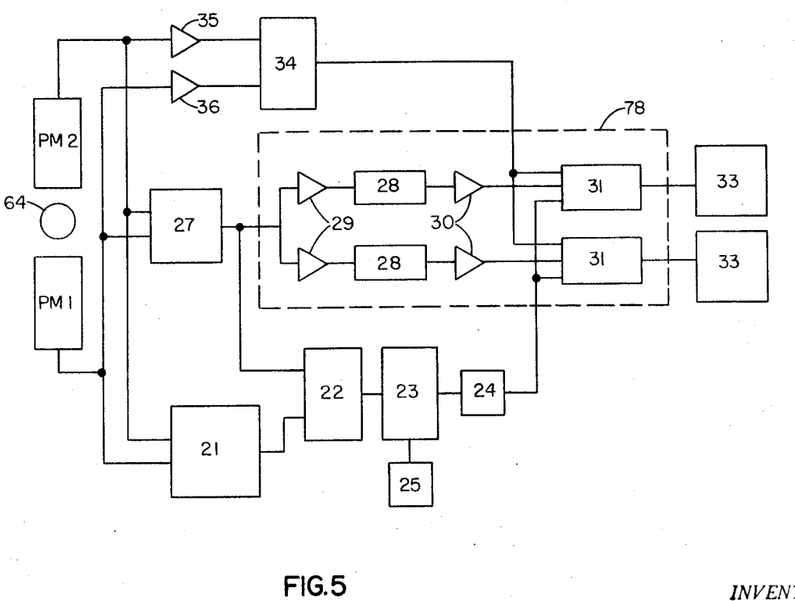
FIG. 5 is a block diagram of a liquid scintillation detecting device improved according to this invention.

It can be shown that various counting efficiency levels can be accurately represented by asymptotic functions in the matrix of FIG. 4. These asymptotic functions are each asymptotic with respect to positive, equal, abscissa and ordinate values that are equal to an asymptotic constant that shifts incrementally upward for increasing counting efficiency levels. Examples of these counting efficiency levels are illustrated at 15, 16, 68, and 84. These asymptotic functions do not intersect, and represent incremental counting efficiency levels that increase with distance from the axis. As can be seen in FIG. 4, the asymptotic function 68 passes through the efficiency determining point 67. The counting efficiency level represented by function 68, therefore, is the coincidence efficiency, as computed on a probability basis, for all coincident pulses having pulse heights equal to the heights of pulses 11 and 12. This efficiency level does not vary with the liquid solvent system, the radioactive isotope in the liquid sample, or the degree of quenching present in the sample. Each raw count of coincident pulses is divided by the efficiency level for that particular count to obtain a corrected pulse count weighted to reflect those coincident pulses of identical amplitude which are not detected and counted. All the corrected pulse counts are added together to obtain the true number of radioactive events occurring. The invention may also be considered as the component parts of an improved liquid scintillation radiation detecting and coincidence counting apparatus. A preferred embodiment of a two channel liquid scintillation counting system is illustrated in FIG. 5, and is comprised of a plurality of photomultiplier means, such as PM1 and PM2, a coincidence detector 34, a pulse summing means 27, a pulse height analysis means 78, pulse count registers 33, and an efficiency determining means. The efficiency determining means has a counting efficiency level storage means 25 for storing signals representing discrete, incremental counting efficiency levels, each such level being associated with an asymptotic function in a two dimensional matrix in which the abscissa and ordinate correspond to the pulse heights of two coincident pulses from PM1 and PM2. The efficiency determining means illustrated utilizes the pulse summing means 27, which also serves the pulse height analysis means 78, for additively combining coincident pulses to produce an amplitude sum thereof. The efficiency determining means also includes a lesser pulse height selecting means 21 for determining the smallest of two coincident pulses, a computer means 22 for locating an efficiency determining point in the two dimensional matrix, and a comparison means 23 for selecting the appropriate single counting efficiency level. In the preferred arrangement, an analogue to digital converter 24 is connected to the output of comparison means 23 and passes a signal to an efficiency compensation means forming part of window logic means 31.

When scintillations occur in sample vial 64, coincident photoelectric pulses are generated in the photomultiplier tubes PM1 and PM2 and are passed through preamplifiers 35 and 36 to coincidence detector 34 which is equipped with a threshold amplitude detector. Coincidence detector 34 detects coincident pulses from PM1 and PM2 while the threshold amplitude detector blocks input pulses of less than a minimum amplitude value and generates output gating signals to window logic means 31 from the coincidence detector 34 only if both of the amplified pulses from the photomultiplier tubes are coincident in time and exceed the threshold limits, designated as 18 for PM1 and 19 for PM2 in FIG. 4.

The pulses generated by PM1 and PM2 are also transmitted to summing means 27, where their pulse heights are added to produce a pulse amplitude sum which is passed to the computer means 22 in the efficiency determining means, and to the pulse height analysis means 78, where the amplitude sum is transmitted through the usual amplifying stages 29 and 30 and through the attenuators 28 interposed therebetween. The pulses are then transmitted to the window logic means 31 containing the efficiency compensation means. At the window logic means 31, the acceptably reliable coincident pulses are determined at least partially on the basis of the pulse sum, usually in the following manner. If the sum of the pulse energy levels falls within prescribed energy level limits, defined as "windows," and if an enabling pulse is received from coincidence detector 34, the appropriate window logic means 31 passes a signal as an output of pulse height analysis means 78. Simultaneously, the pulses from PM1 and PM2 are passed to the lesser pulse height selecting means 21 for determining the smallest of the coincident pulses. The signal eminating from lesser pulse height selecting means 21 is equal to the second largest of the coincident pulses received, which is the smallest of the two pulses entering lesser pulse height selecting means 21. The pulse amplitude sum is passed from summing means 27 to the computer means 22. The computer 22 then utilizes the amplitude sum signal from summing means 27 and the lesser pulse signal from lesser pulse height selecting means 21 for determining counting efficiency. This is done by locating an efficiency determining point in a two dimensional matrix. As previously described and illustrated in FIG. 4, the efficiency determining point is based on the amplitude sum of coincident pulses and on the smallest of the coincident pulses. The comparison means 23 selects a single counting efficiency level, as transmitted from counting efficiency level storage means 25. The signals transmitted from storage means 25 to comparison means 23 represent discrete, incremental counting efficiency levels, each such level being associated with an asymptotic function in a two dimensional matrix in which the abscissa and ordinate correspond to the pulse heights of the pulses from PM1 and PM2. The single counting efficiency selected by comparison means 23 is associated with the single asymptotic function that passes through the efficiency determining point. If the counting efficiency increments are so large that no one of the incremental asymptotic functions passes through the efficiency determining point, then the single counting efficiency for a particular efficiency determining point is obtained by interpolating between the two asymptotic functions bracketing the efficiency determining point. Once selected the single counting efficiency is passed to the analogue to digital converter 24. The analogue to digital converter 24 passes signals to the efficiency compensation means in each of the window logic means 31. The efficiency compensation means corrects each raw pulse count received on the basis of the single counting efficiency from converter 24 associated therewith to produce an efficiency corrected adjusted pulse count. This adjusted pulse count may take the form of a pulse train containing a number of identical pulses numerically equal to: $1/E - 1$, where E is the counting efficiency level. The pulse train is transmitted to and registered in a pulse count register 33.

If the probability, or efficiency, of recordation of two coincident pulses having given pulse heights is 20 percent, an efficiency compensation means receives a raw count signal from an amplifier 30, representing only one radioactive event having the given pulse heights. The analogue to digital converter 24 divides a numeric 1 by 0.20, thereafter subtracting a numeric one to obtain the true number of radioactive events actually occurring, considering the raw count signal already transmitted to the efficiency compensation means from amplifiers 30. A pulse train is generated by converter 24 from the single raw pulse count signal. For a single pulse count passed to lesser pulse height selecting means 21, four pulse counts, each showing coincident pulses having the pulse heights under consideration, are then additionally passed to the window logic means 31. If the pulses from amplifiers 30 fall within either or both of the energy windows, and if the windows are also gated by coincidence detecting means 34, then and only then are all 5 pulses passed to one or both of the pulse count registers 33.

The component portions of the liquid scintillation system of FIG. 5 are all standard components in liquid scintillation devices and in related electrical fields with the exception of the lesser pulse height selecting means 21. The operation of the lesser pulse height selecting means 21 is further illustrated in FIG. 6. Input leads 39 and 40 form electrical connections between the lesser pulse height selecting means and between the photomultiplier tubes PM1 and PM2 respectively. High gain amplifiers 37 and 38 are associated with PM2 and PM1 respectively. High gain amplifier 37 has an input connected to input lead 40 through resistor 57 and another input grounded through resistor 52. High gain amplifier 38 has an input connected to input lead 39 through resistor 56 and another input lead 79' grounded through resistor 54. Each of the high gain amplifiers 37 and 38 has an output connected to transistors 45 and 46 respectively. The transistor 45 is associated with photomultiplier tube PM2, and has a base 50, an emitter 47, and a collector 49. Similarly, transistor 46 has a base 51, an emitter 71 and a collector 48 and is associated with PM1. The base 50 is connected to the output of high gain amplifier 37 while the base 51 is connected to the output of high gain amplifier 38. A common voltage source 42 is a positive voltage source and has parallel voltage taps connected to the emitters 47 and 71. Voltage source 42 is also connected to the input of a unity gain amplifier 41. The collectors 48 and 49 are connected to negative voltage sources 43 and 44 respectively, although they might instead be connected to ground. A resistor 58 is located between the voltage source 42 and the voltage taps to the emitters 47 and 71. A unity gain amplifier 41 has an input connected to voltage source 42 between the voltage taps to emitters 47 and 71 at 75 and an output connected to feedback leads 72 and 73. Each of the feedback leads 72 and 73 contains a resistor 55 and 53 respectively. Feedback lead 72 is connected to the input lead 39 of high gain amplifier 38 while feedback leads 73 is connected to the input lead 40 of high gain amplifier 37. A direct current stabilization circuit is connected between the collector 48 of the transistor 46 and the input leads 79' and 40 of high gain amplifiers 38 and 37 respectively. To form the d.c. stabilization circuit, resistors 75' and 80 are connected in series between input lead 79' and collector 48. A T-network is formed by the insertion of a lead to capacitor 81 between the resistors 75' and 80. Capacitor 81 is thereafter grounded. A positive voltage source 82 is connected through a resistor 83 to a point between resistors 75' and 80 for bias current. To complete the d.c. stabilization circuit, another lead 74 extends from between resistors 75' and 80 to input lead 40 associated with high gain amplifier 37.

Figure 6:
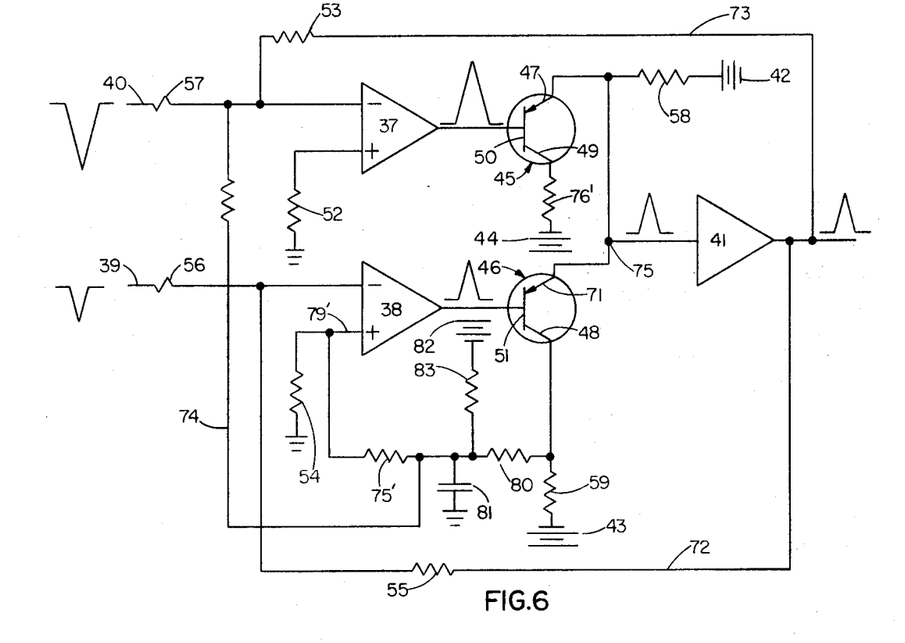
FIG. 6 is a schematic diagram further illustrating a portion of the device of FIG. 5.

The d.c. stabilization circuit depicted provides automatic self correction for any current imbalance flowing from the positive voltage source 42 to the emitters 47 and 71 of transistors 45 and 46.

In the operation of the lesser pulse height selecting means, a voltage potential is maintained between the positive voltage source 42 and the negative voltage sources 43 and 44. The voltage source 42 is equal to, but opposite in sign to the negative voltage sources 43 and 44. The resistors 58, 59, and 76' are all equal. It can be seen that when no pulses exist on the input leads 39 and 40, the voltage potential at the input to the unity gain amplifier is equal to the voltage potential at the emitters 47 and 71. When pulses are received, however, the bases of the two transistors tend toward being back biased. That is, current flow from emitter to collector is hindered in both of the transistors. This causes the voltage potential at the input to the unity gain amplifier 41 to rise. Unity gain amplifier 41 thereafter increases the voltage at the leads 39 and 40. This voltage feedback continues until the transistor associated with the photomultiplying tube having the largest pulse reaches cut-off. That is, the back bias of the transistor base prevents current flow through that transistor. In FIG. 6 the largest voltage pulse is shown at the input lead 40 so that the transistor 45 becomes back biased and cuts off. Because transistor 45 is cut off, transistor 46, the transistor associated with the smallest voltage pulse, is the only transistor remaining conducting. For this reason the smaller pulse appearing at the input lead 39 is the only pulse transmitted through the unity gain amplifier 41 and then to the computing means 22 as illustrated in FIG. 5.

Figure 11:
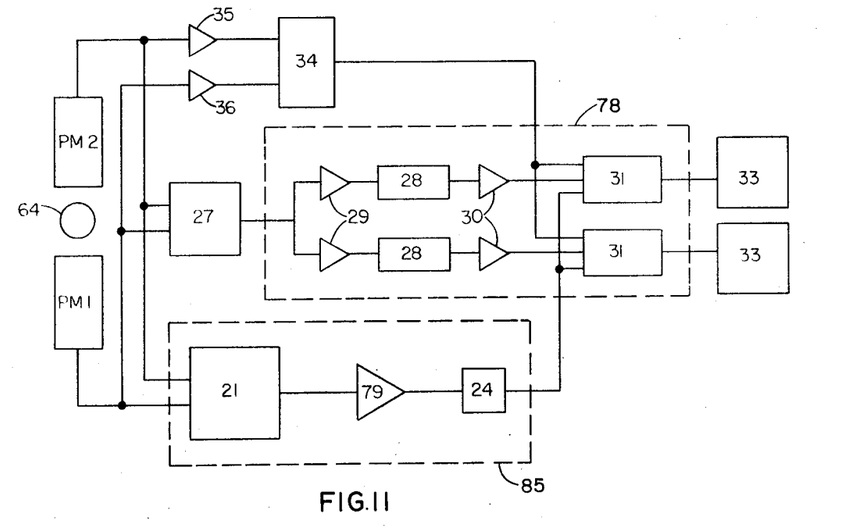
FIG. 11 is a block diagram of a liquid scintillation detecting device alternative to that of FIG. 5.
Figure 12:
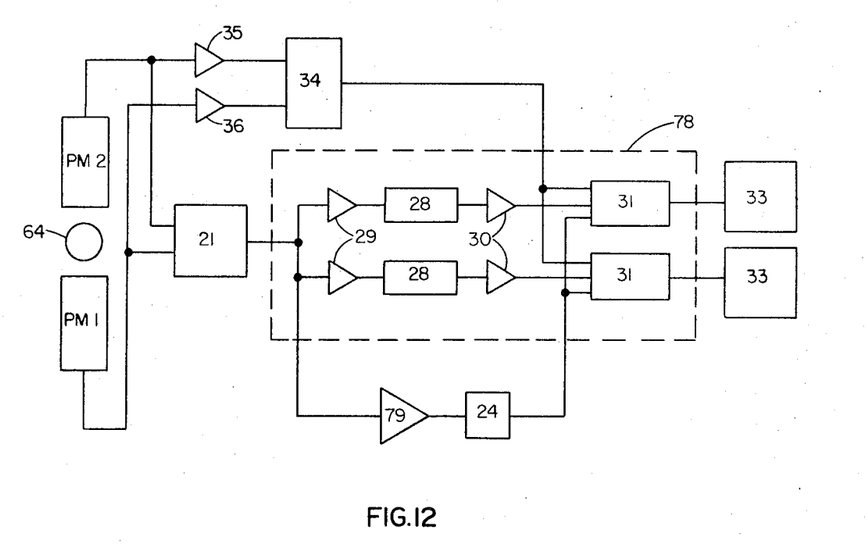
FIG. 12 is a block diagram of another liquid scintillation detecting device alternative to that of FIG. 5.

While the preferred embodiment of the improved liquid scintillation device of this invention determines the approximate counting efficiency level on the basis of both coincident pulse amplitude sum and the amplitude of the smallest of the coincident pulses as in FIGS. 4 and 5, a very accurate approximate counting efficiency level can be determined based on only the amplitude of the smaller of two coincident pulses using a simplified form of the invention. Such embodiments are illustrated in FIGS. 11 and 12. The photomultiplier means, the coincidence detector, the pulse height analysis means, and the pulse count register in FIG. 11 all operate in the same manner as the corresponding devices in FIG. 5. The efficiency determining means 85 of FIG. 11 is much simpler, however. Both of the photomultiplier means PM1 and PM2 are connected to a lesser pulse height selecting means 21 for determining the smaller of two coincident pulses. The circuitry of lesser pulse height selecting means 21 was described in conjunction with FIG. 6. Connected to lesser pulse height selecting means 21 is a function generating means 79. The function generating means 79 acts upon the smaller of two coincident pulses, which is transmitted from lesser pulse height selecting means 21, in accordance with a mathematical function in which the smaller of the two coincident pulses is the predominating independent variable. Since function generating means 79 may apply a mathematical function, which may be the inverse of curve 70 in FIG. 3, to the pulse from lesser pulse height selecting means 21, an efficiency compensation signal may be generated and passed to converter 24.

In the operation of the device of FIG. 11, the lesser pulse height selecting means selects the smaller of two coincident pulses. The inverse counting efficiency level is approximated from the above mathematical function. The function generating means 79 solves the mathematical function for the single counting efficiency level uniquely associated with the amplitude of the smaller of the two coincident pulses. This single counting efficiency level is passed to analogue to digital converter 24 and a pulse train is transmitted to the efficiency compensation means in window logic means 31, where it is acted upon as previously described in connection with FIG. 5. It should be noted that pulse summing means 27 is not connected to the efficiency determining means of FIG. 11, as pulse sum plays no part in the determination of efficiency in this embodiment.

The embodiment of FIG. 12 differs from that of FIG. 11 in that not only does the pulse amplitude sum not influence efficiency determination, but it has no influence on pulse height analysis either. The pulse height analysis means 78 performs pulse height analysis on only the lesser of two coincident pulses. As in FIG. 11, the efficiency correction means produces a signal which is both uniquely associated with the magnitude of the smaller of the two coincident pulses from PM1 and PM2, and which represents a single pulse counting efficiency associated with all pulses having the pulse heights of the two coincident pulses analyzed. As in the other embodiments of the invention depicted, the efficiency compensation means accepts the output of analogue to digital converter 24 in order to alter the number of counts recorded in the pulse count registers 33, thereby reflecting the actual number of radioactive disintegrations occurring per unit of time in the radioactive sample. It should be noted that by using the lesser pulse height selecting means 21 for providing inputs to the pulse height analysis means 78, it would be possible to delete the coincidence detector 34 equipped with the threshold amplitude detector, as the lesser pulse height circuit depicted in FIG. 6 could perform the function of coincidence and threshold detection. For reasons of speed and resolving time, however, this is not a preferred arrangement.

Figure 13:
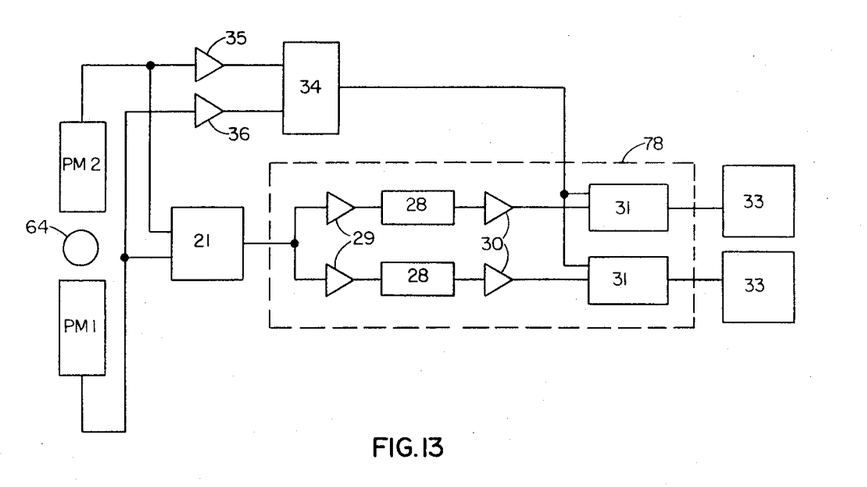
FIG. 13 is a block diagram of a liquid scintillation device employing color quenching correction according to this invention.

The concept of performing pulse height analysis on only the smaller or lesser of two coincident pulses rather than on the basis of the amplitude sum as in conventional liquid scintillation systems, can be carried one step further to arrive at a liquid scintillation system internally corrected for color quenching. Such a system is illustrated in FIG. 13 where a lesser pulse height selecting means 21 is substituted for the pulse summing means in an otherwise conventional liquid scintillation system. The lesser pulse height selecting means 21 is interposed between the photomultiplier tubes PM1 and PM2 and provides input signals to the channel pulse height analysis means 78.

In the operation of the liquid scintillation counting device of FIG. 13, scintillations are first detected by the photomultiplying tubes PM1 and PM2, which generate electrical pulses in response thereto. The smaller of two coincident pulses generated by PM1 and PM2 is selected and transmitted to pulse height analysis means 78, where normal pulse height analysis is performed in the differential discriminator of window logic means 31. The pulse counts recorded in pulse count registers 33 are selectively unaffected by color quenching in the sample 64, however, unlike conventional systems in which pulse height analysis is performed on the amplitude sum of coincident pulses.

Figure 7:
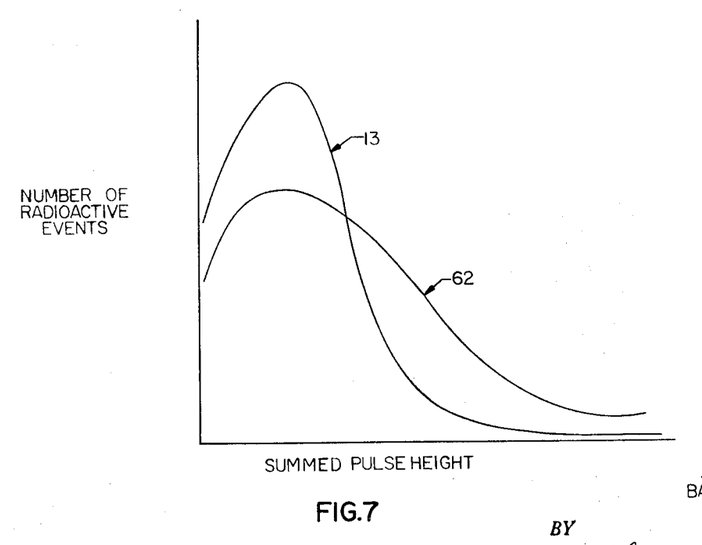
FIG. 7 illustrates spectral distribution as determined with a conventional system in color quenched and chemically quenched liquid samples using identical radioactive sources.
Figure 8:
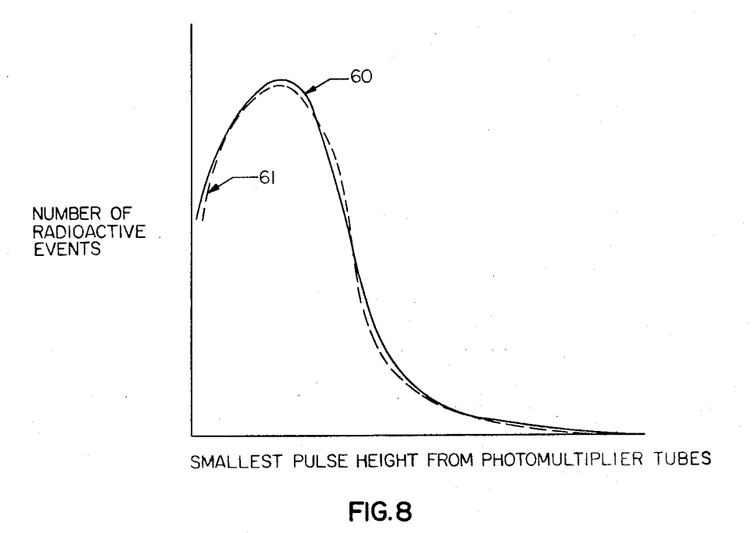
FIG. 8 illustrates spectral distribution determined with the present invention in color quenched and chemically quenched liquid samples using the same radioactive sources as in FIG. 7.

The accuracy of the color quenching correction means in determining the pulse height distribution of the number of radioactive events occurring is best illustrated in FIGS. 7 and 8. FIG. 7 illustrates the spectral analysis of a number of radioactive events in a color quenched liquid and in a chemically quenched liquid using a sum of the pulse heights from each phototube, as in a conventional system. Of course, the pulse heights and number of radioactive events vary depending upon the radiation source and exposure time used. For a carbon 14 radioactive sample the number of radioactive events, as a function of summed pulse height conforms to spectral distribution as depicted by curves 62 and 13 in color quenched and chemically quenched liquids respectively. It can be seen that the spectral distribution varies widely, depending upon whether or not the liquid sample is color quenched despite the fact that the average efficiency of pulse collection is the same, about 70 percent for both of the curves 13 and 62. In contrast, to the analysis based on summed pulse height the curves 60 and 61 in FIG. 8 depict pulse height distribution in liquids that are chemically quenched and color quenched respectively using the method of efficiency determination disclosed in this invention. The curves 60 and 61 were derived from the same carbon 14 samples used to arrive at the curves 13 and 62 in FIG. 7. Since the curves 13 and 60 were derived from the same sample, and since the curves 62 and 61 were derived from a common sample, the average efficiencies of pulse collection depicted by the curves 60, 61, 13, and 62 are all identical. It must be remembered, of course, that the gain setting of FIG. 7 is significantly less than the gain setting of FIG. 8. In FIG. 8, it should be noted how closely the path 61 follows the plot 60 of the number of detected radioactive events occurring in an identical radioactive source in a liquid sample in which only chemical quenching is present. This close relationship may be shown for different radioactive samples, and thus does not vary with the sample solution nor with the degree of color quenching occurring in the sample solution, as long as the average efficiency remains uniform. That is in marked contrast to the plot of spectral distribution as between color quenched and chemically quenched liquids in a conventional system as in FIG. 7. In FIG. 7, the curves 13 and 62 were derived using the conventional summed pulse height analysis. The curve 62 could vary in contour with varying degrees of chemical quenching combined with a varying degree of color quenching depending upon the sample solution used. It can be seen that spectral distribution using the method of compensating for color quenching in the present invention is independent of color quenching in marked contrast to conventional systems.

Figure 9:
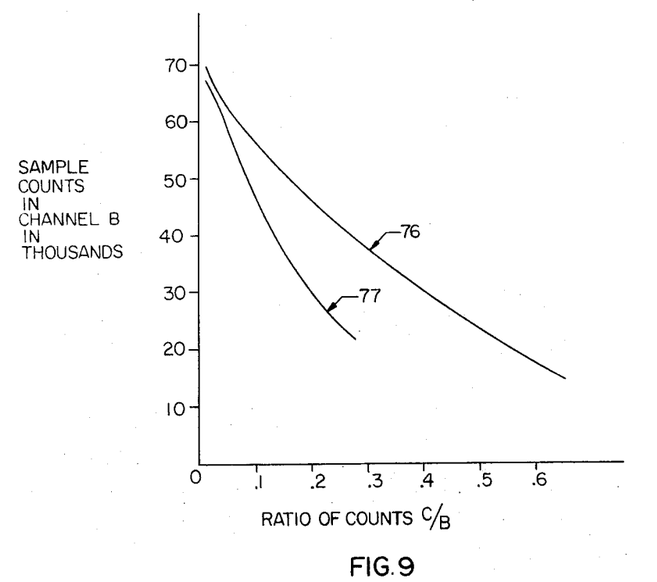
FIG. 9 illustrates the plot of detected events versus sample channels ratio in color quenched and chemically quenched samples using summed pulse height analysis.

This same feature may be further illustrated by reference to FIGS. 9 and 10. Line 76 in FIG. 9 shows an interpolated curve representing uncolored chemically quenched standards. Curve 76 shows the relationship between pulse counts in an integral channel and the channels ratio of two overlapping summed pulse height windows. Channel B is an integral window while window C is a much smaller window at the lower edge of integral window B. It can be seen that the channels ratio varies inversely with the total number of pulse counts. The line 76 is characteristic of a sealed standard of carbon 14 having a radioactivity of 71,030 disintegrations per minute, and holds true where the liquid media is: toluene PPO $CCl_4$, toluene PPO-POPOP $CCl_4$, or dioxane $CCl_4$. When carbon 14 standards are color quenched with red dye instead of being chemically quenched with $CCl_4$ the relationship changes considerably as indicated by the line 77. Line 77 represents a carbon 14 standard in toluene PPO-POPOP quenched with Calco Oil Red, manufactured by American Cyanamid and sold with the nomenclature N-1700. Other conventional color quenchers are also available. It can be seen that because of the variations in pulse height distribution where measured on the basis of summed pulse heights, as between chemically quenched and color quenched samples, the channels ratio varies widely, depending upon the degree of color quenching present. It follows that for accuracy, a different quench curve must be used for each degree of color quenching present in samples being analyzed.

Figure 10:
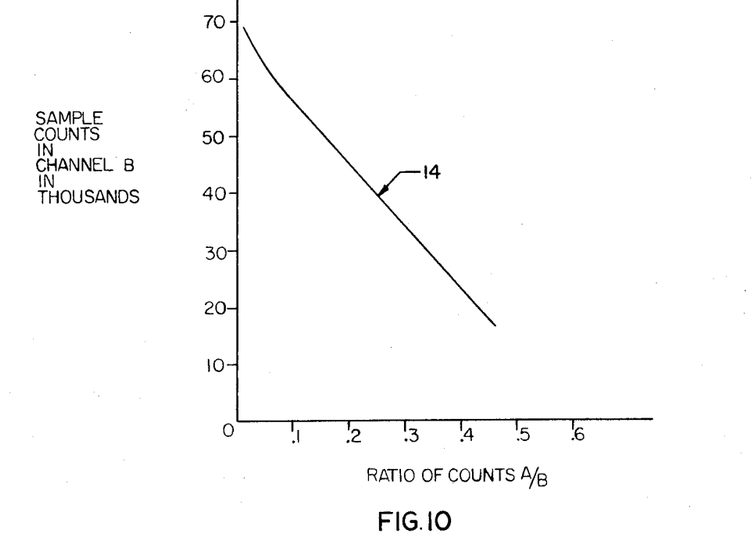
FIG. 10 illustrates the plot of detected events in color quenched and chemically quenched samples using the method of pulse height analysis of this invention.

Noticeably different results are present in FIG. 10, which depicts a quench correction line 14 for the same radioactive carbon 14 standards used in FIG. 9. In FIG. 10 the correlation between pulse counts in integral channel B and the channels ratio for a smaller window A with respect to the integral window B remains constant despite varying degrees of coloring in the liquid sample. Curve 14 is valid for the carbon 14 sample used whether it is in liquids comprised of toluene PPO $CCl_4$, toluene PPO-POPOP $CCl_4$, dioxane $CCl_4$, or toluene PPO-POPOP with red dye. As a result, the efficiency correction achieved with this invention can be seen to be independent of color quenching, even using conventional methods, such as the channels ratio method, of actual count determination.

The detailed descriptions and illustrations of the preferred embodiments and preferred practices of the invention have been given for purposes of illustration only, and no unnecessary limitations should be construed therefrom. For example, the method of counting radioactive events by compensating for counting efficiencies of less than unity is equally as applicable to single photomultiplier tube systems as it is to multiple tube systems. In its broader form, this manner of practice of the invention is a method of counting radioactive events in a liquid scintillation radiation detecting and counting apparatus utilizing pulses generated by a photomultiplying means resulting from scintillations caused by radioactive events. Compensation for counting efficiencies involves assigning a counting efficiency value to each pulse generated in the photomultiplying means according to pulse height, as may be ascertained from FIGS. 2 and 3; determining the numerical inverse of each assigned counting efficiency value, as was explained in connection with FIG. 5; and recording each numerical inverse as an actual number of radioactive events each having a pulse height identical to that of the corresponding pulse generated in said photomultiplying means. Of course, if the numerical inverse is a fractional value, then the numerical inverse could be multiplied by some value and later divided by that same value.

Another minor variation within the scope of the invention involves the substitution of blocking diodes for the transistors 45 and 46 in FIG. 6 with the negative voltage sources 43 and 44 eliminated entirely. Also, the color quenching medium used is immaterial, as the same results will occur as illustrated whatever the color quenching substance utilized. Moreover, other embodiments and utilizations will be apparent to those familiar with liquid scintillation detection. For example, photomultiplying means may be taken to include any form of photodetecting means and many of the analogue devices illustrated may be replaced by digital computation means and many of the steps performed with the illustrated analogue devices may also be performed manually or with digital computation equipment.

I claim as my invention:

1. A method for determining counting efficiency in in a liquid scintillation radiation detecting and coincidence counting apparatus from coincident pulses generated by a pair of photomultiplying means resulting from scintillations caused by radioactive events comprising: selecting the smaller of two coincident pulses, approximating counting efficiency level by equating counting efficiency level to a mathematical function in which the smallest of two coincident pulses is the predominating independent variable, and solving said mathematical function for a single counting efficiency level associated with the aforesaid smaller of said two coincident pulses.

2. The method of claim 1 wherein said smallest of two coincident pulses is the sole independent variable.

3. A method for determining counting efficiency in a liquid scintillation radiation detecting and coincidence counting apparatus for coincident pulses generated by a pair of photomultiplying means resulting from scintillations caused by radioactive events comprising: associating counting efficiency levels with asymptotic functions in a two dimensional matrix in which the abscissa and ordinate correspond to the pulse heights from each individual photomultiplying means in said pair of photomultiplying means, locating an efficiency determining point in said matrix as determined by the amplitude sum of each set of coincident pulses and the amplitude of the smallest pulse in said set of coincident pulses from said pair of photomultiplying means, and selecting the single counting efficiency level that has a function associated therewith passing through said efficiency determining point in said matrix.

4. The method of claim 3 wherein said efficiency determining point is located in the matrix at the intersection of the locus of values equal to the amplitude of the aforesaid smallest pulse and the locus of values of the amplitude sum of the pulses in said set of coincident pulses.

5. The method of claim 3 wherein incremental counting efficiency levels are associated with the aforesaid asymptotic functions.

6. In a method of determining disintegrations per unit of time in radioactive samples in a liquid scintillation radiation detecting and coincidence counting device having a plurality of photomultiplier means, a coincidence detector equipped with a threshold amplitude detector, an efficiency analyzing means, a pulse height analysis means, and a pulse count register, the improvement comprising:

a. detecting pulses from said photomultiplier means, b. screening out pulses of less than a minimum amplitude value and identifying coincident pulses by passing pulses from said photomultiplier means to said coincidence detector and by detecting output pulses from said coincidence detector, c. passing pulses from said photomultiplier means to a pulse summing means, d. additively combining the amplitudes of coincident pulses in said pulse summing means to produce a pulse sum, e. passing said pulse sum to a pulse height analysis means, f. determining acceptably reliable coincident pulses in said pulse height analysis means at least partially on the basis of said pulses sum, and utilizing said acceptably reliable coincident pulses as outputs of said pulse height analysis means representing raw pulse counts, g. determining counting efficiency in said efficiency analyzing means as a function of the amplitude of the second largest of said coincident pulses, h. correcting each of said raw pulse counts on the basis of the counting efficiency associated therewith to produce efficiency corrected pulse counts, and i. registering said efficiency corrected pulse counts in said pulse count register.

7. The method of claim 6 wherein to determine counting efficiency, counting efficiency levels are associated with asymptotic functions in a two dimensional matrix in which the abscissa and the ordinate correspond to the pulse heights of two coincident pulses, and further comprising locating an efficiency determining point in said matrix as determined by the amplitude sum of said two coincident pulses and the amplitude of the second largest of said coincident pulses, and selecting the single counting efficiency level that has a function associated therewith passing through said efficiency determining point in said matrix, and correcting said raw pulse count on the basis of said single counting efficiency level.

8. The method of claim 7 wherein said asymptotic functions are each asymptotic with respect to positive, equal abscissa and ordinate values that are equal to an asymptotic constant that shifts incrementally upward for increasing counting efficiency levels.

9. A method of correcting for detection inefficiency in a liquid scintillation radiation detecting and coincidence counting apparatus having pulse height analysis means and pulse count register means and utilizing coincident pulses generated by a pair of photomultiplying means resulting from scintillations caused by radioactive events comprising: selecting the smaller of two coincident pulses, approximating counting efficiency level by equating counting efficiency level to a mathematical function in which the smallest of two coincident pulses is the predominating independent variable, solving said mathematical function for a single counting efficiency level associated with the aforesaid smaller of said two coincident pulses, and adjusting the output of said pulse height analysis means on the basis of the aforesaid single counting efficiency level so as to alter the number of coincident pulse counts recorded in said pulse count register means thereby reflecting the actual number of radioactive events occurring per unit of time.

10. A method of compensating for color quenching using a liquid scintillation radiation detecting and coincidence counting apparatus having photomultiplying means and pulse height analysis means comprising detecting scintillations caused by radioactive events, generating coincident pulses in a pair of photomultiplying means responsive to said scintillations, selecting the smaller of two coincident pulses, and transmitting said smaller pulse to said pulse height analysis means as an input signal thereto.

11. In a method of counting radioactive disintegrations in a liquified sample utilizing a liquid scintillation radiation detecting and coincidence counting apparatus having photomultiplying means and pulse height analysis means, the improvement comprising compensating for color quenching by detecting scintillations caused by radioactive events, generating coincident pulses in a pair of photomultiplying means responsive to said scintillations, selecting the smaller of two coincident pulses, and transmitting said smaller pulse to said pulse height analysis means as an input signal thereto, thereby representing the actual detection efficiency of the radioactive event causing the aforesaid coincident pulses in a manner largely insensitive to any color quenching present.

12. In a liquid scintillation radiation detecting and coincidence counting apparatus having a plurality of photomultiplier means for generating pulses, a coincidence detector for detecting coincident pulses and equipped with a threshold amplitude detector, a pulse summing means, pulse height analysis means, and pulse count register means, the improvement comprising an efficiency determining means including a lesser pulse height selecting means for determining the smaller of two coincident pulses, a function generating means for acting upon the aforesaid smaller of said two coincident pulses in accordance with a mathematical function to produce a signal uniquely associated with the magnitude of the aforesaid smaller of said two coincident pulses, and a counting efficiency level recording means for accepting the aforesaid signal as the approximate counting efficiency level of the coincident pulse received.

13. The apparatus of claim 12 wherein said function generating means comprises amplifier means.

14. In a liquid scintillation radiation detecting and coincidence counting apparatus having a plurality of photomultiplier means, a coincidence detector equipped with a threshold camplitude detector, a pulse summing means, a pulse height analysis means, and a pulse count register means, the improvement comprising an efficiency determining means including a counting efficiency level storage means for storing signals representing discrete, incremental counting efficiency levels, each such level being associated with an asymptotic function in a two dimensional matrix in which the abscissa and ordinate correspond to the pulse heights of two coincident pulses from two of said photomultiplier means; summing means for additively combining the pulse heights of said two coincident pulses to produce an amplitude sum; a lesser pulse height selecting means for determining the smallest of said coincident pulses; a computer means for locating an efficiency determining point in said matrix on the basis of said amplitude sum and the aforesaid smallest pulse; a comparison means for selecting the single counting efficiency level for which the asymptotic function associated therewith passes through said efficiency determining point and thereby determining counting efficiency.

15. The improved apparatus of claim 14 further comprising an analogue to digital converter and efficiency compensation means for correcting a raw coincident pulse count on the basis of the aforesaid single counting efficiency to produce an adjusted pulse count, in which said comparison means is connected to said analogue to digital converter which in turn is connected to said efficiency compensation means for passing a signal related to counting efficiency from said efficiency determining means to said efficiency compensation means.

16. The improved apparatus of claim 14 wherein said lesser pulse height selecting means is comprised of:

a. input leads from each of said photomultiplier means, b. high gain amplifiers each associated with a single photomultiplier means and each having an output and each having an input connected to one of the aforesaid input leads, c. transistors, each associated with a single photomultiplier tube and each having a base connected to the output of the corresponding high gain amplifier,
d. a unity gain amplifier having an input and an output, with feedback leads each containing a resistor from said output of said unity gain amplifier to an input of each of said high gain amplifiers,
e. a common voltage source connected to the input of said unity gain amplifier and having parallel voltage taps bracketing the connection to the input of said unity gain amplifier and connected to the emitters of the transistors,
f. a resistor located between said voltage source and said voltage taps, and
g. a direct current stabilization circuit connected between the collector of one of the aforesaid transistors and the inputs of both of said high gain amplifiers, whereby voltage pulses from said photomultiplier means tend to back-bias said transistors and the transistor associated with the photomultiplier means generating the smallest voltage pulse of a set of coincident pulses conducts current to said unity gain amplifier and all of the other transistors are back-biased beyond cut off and do not conduct current, so that only the smallest voltage pulse is conducted.

17. In a liquid scintillation radiation detecting and coincidence counting apparatus having a radioactive sample to be analyzed, a plurality of photomultiplier means for generating pulses, a coincidence detector equipped with a threshold amplitude detector for detecting coincident pulses, pulse height analysis means, and pulse count register means, the improvement comprising an efficiency correction means including a lesser pulse height selecting means for determining the smaller of two coincident pulses, a function generating means for acting upon the aforesaid smaller of said two coincident pulses in accordance with a mathematical function to produce a signal uniquely associated with the magnitude of the aforesaid smaller of said two coincident pulses and representing the single pulse counting efficiency associated with pulses having the pulse heights of the aforesaid coincident pulses and an efficiency compensation means for accepting the aforesaid signal and adjusting the output of said pulse height analysis means on the basis of the aforesaid single counting efficiency in order to alter the number of counts recorded in said pulse count register means thereby reflecting the actual number of radioactive disintegrations occurring per unit of time in the aforesaid radioactive sample.

18. The apparatus of claim 17 wherein said function generating means comprises linear amplification means.

19. The apparatus of claim 17 wherein said lesser pulse height selecting means is connected to said pulse height analysis means to provide input signals thereto.

20. In a liquid scintillation radiation detecting and coincidence counting apparatus having a plurality of photomultiplier means for generating pulses, a coincidence detector equipped with a threshold amplitude detector for detecting coincident pulses, a pulse height analysis means, and pulse count register means, the improvement comprising a color quenching correction means including a lesser pulse height selecting means for determining the smaller of two coincident pulses connected to said photomultiplier means and said pulse height analysis means for providing input signals to said pulse height analysis means.

21. A method of counting radioactive events in a liquid scintillation radiation detecting and counting apparatus utilizing pulses generated by a photomultiplying means resulting from scintillations caused by radioactive events comprising compensating for counting efficiencies of less than unity by performing the steps of: assigning a counting efficiency value to each pulse generated in said photomultiplying means according to pulse height, determining the numerical inverse of each assigned counting efficiency value, and recording each numerical inverse as an actual number of radioactive events each having a pulse height identical to that of the corresponding pulse generated in said photomultiplying means.

* * * * *